United States Patent [19]

Kerschner

[11] 3,912,286
[45] Oct. 14, 1975

[54] SEALING MEMBER
[75] Inventor: James J. Kerschner, Tonawanda, N.Y.
[73] Assignee: Acme Highway Products Corporation, Buffalo, N.Y.
[22] Filed: Nov. 9, 1973
[21] Appl. No.: 414,356

[52] U.S. Cl. ..................... 277/225; 404/65; 404/68
[51] Int. Cl.² ........................................... F16J 15/02
[58] Field of Search .......... 277/225; 404/65, 66, 67, 404/68, 69; 52/393, 395, 396, 468; 285/109, 397, 370

[56] References Cited
UNITED STATES PATENTS

| | | |
|---|---|---|
| 2,230,303 | 2/1941 | Leguillon ............................. 404/65 |
| 3,163,448 | 12/1964 | Franklin ............................. 277/225 |
| 3,179,026 | 4/1965 | Crone ..................... 52/396 |
| 3,363,383 | 1/1968 | La Barge ........................ 404/65 X |
| 3,778,176 | 12/1973 | Pax ....................................... 404/65 |

FOREIGN PATENTS OR APPLICATIONS 956,706   4/1964   United Kingdom ................... 404/65

*Primary Examiner*—Richard E. Aegerter
*Assistant Examiner*—L. Footland
*Attorney, Agent, or Firm*—Christel & Bean

[57]   ABSTRACT

A resiliently yieldable sealing member having a body portion insertable into a joint groove and an integral T-shaped head formation overlying the body portion and adapted to be disposed outwardly of the joint groove for covering the same.

5 Claims, 5 Drawing Figures

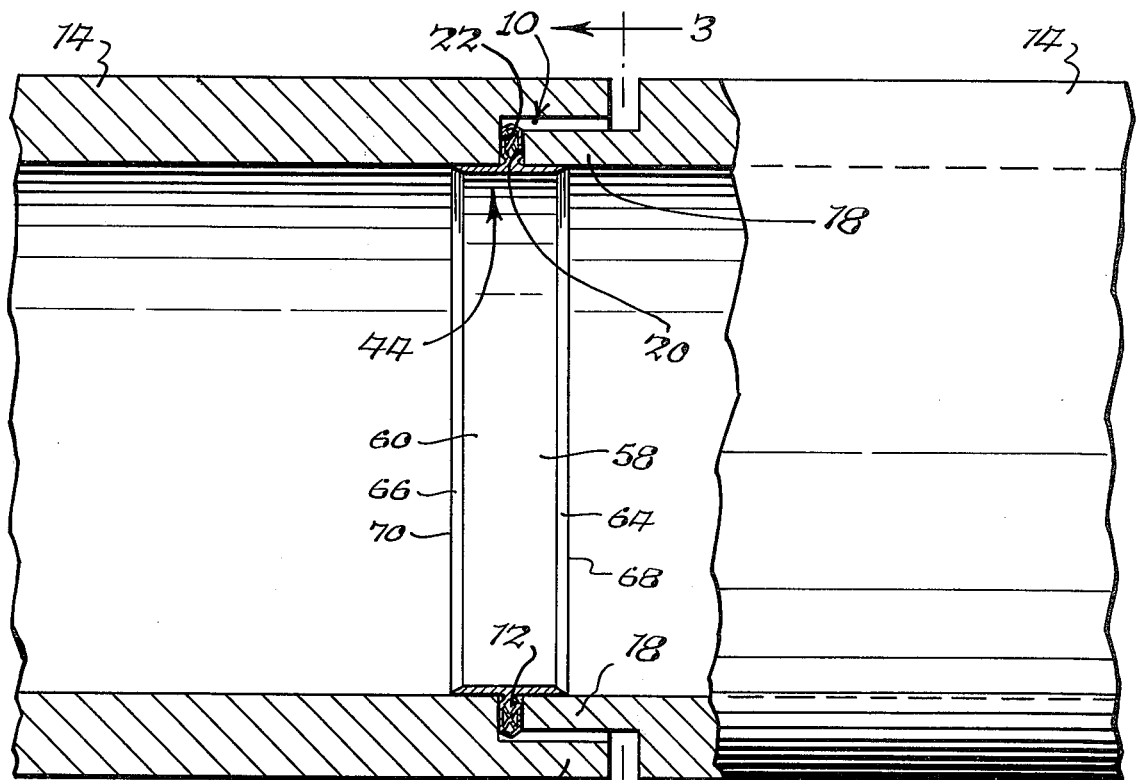
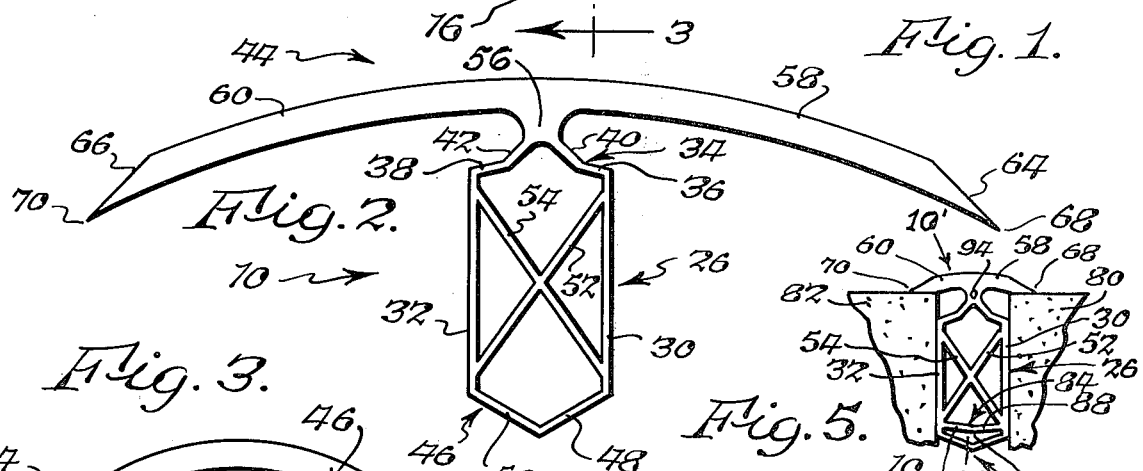
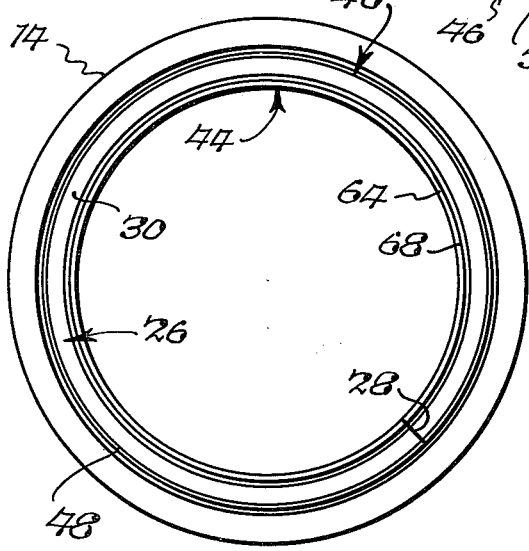
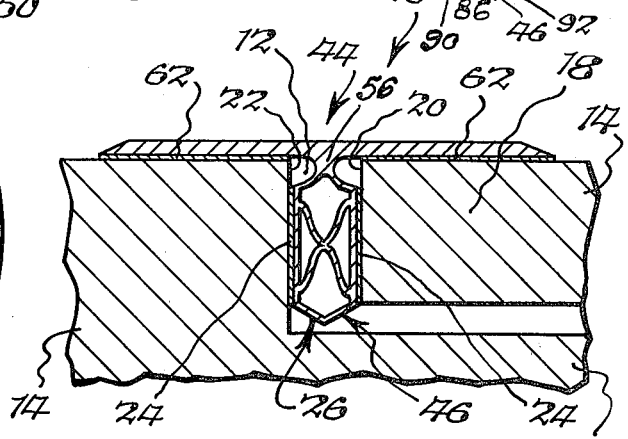

SEALING MEMBER

BACKGROUND OF THE INVENTION

This invention relates to sealing members and, more particularly, to sealing members employed in joints, such as those formed between adjacent pipe sections and the like.

In the construction of pipe lines in which pipe sections of concrete or other materials are joined together in axial end-to-end relation, provision must be made to seal the joints formed therebetween to preclude the entry of foreign liquids and substances into the pipeline which might contaminate the materials flowing therethrough or to prevent the escape of the flowing materials outwardly therefrom for obvious reasons. Sometimes, and particularly in lapped joint constructions, the joints are sealed by O-rings which often require a groove to be cut into at least one of the opposing faces of adjacent pipe sections to maintain the O-ring in place and prevent the extrusion thereof outwardly from the joint between the adjacent pipe sections. However, the formation of these seal retaining grooves is time consuming, adding to the construction costs. Moreover, the use of O-rings in such lapped joints have not been entirely satisfactory.

SUMMARY OF THE INVENTION

It is an object of the present invention to provide an improved tubular sealing member obviating the above disadvantages and especially adapted for pipe joint and architectural constructions.

It is another object of this invention to provide the foregoing sealing member with an integral formation overlying and shielding the joint in which the body of the sealing member is inserted.

In one aspect thereof, the sealing member of the present invention is characterized by the provision of a generally T shaped formation projecting from the body of the sealing member and having laterally extending portions spaced from the sealing member body and adapted to overlie the joint groove and engage portions of the structural sections adjacent such joint.

The foregoing and other objects, advantages and characterizing features of the present invention will become clearly apparent from the ensuing detailed description of an illustrative embodiment thereof, taken together with the accompanying drawing wherein like reference characters denote like parts throughout the various views.

BRIEF DESCRIPTION OF THE DRAWING FIGURES

FIG. 1 is a longitudinal sectional view of a pair of pipe sections, showing a sealing member of this invention disposed in the joint groove formed between such pipe sections;

FIG. 2 is an end elevational view, on an enlarged scale, of the sealing member of FIG. 1, shown in its natural, uncompressed condition;

FIG. 3 is a side elevational view, on a reduced scale, of the sealing member of this invention, looking in the direction of arrows 3—3 of FIG. 1;

FIG. 4 is a fragmentary, longitudinal sectional view, on an enlarged scale, showing the sealing member of this invention adhesively secured in place between adjacent pipe sections; and FIG. 5 is an end elevational view, of another form of sealing member of this invention, shown secured in place between adjacent building slabs of an architectural structure.

DETAILED DESCRIPTION OF AN ILLUSTRATIVE EMBODIMENT

While the tubular sealing member of this invention has utility in architectural structures and a wide variety of other applications, it will be convenient to describe the utility thereof in connection with pipe joints, such as are formed between the adjacent ends of pipe sections in a piping system.

Referring now in detail to the illustrative embodiment depicted in the drawing, there is shown in FIG. 1 an annular, resiliently yieldable sealing member, generally designated 10, constructed in accordance with this invention and installed in an annular groove 12 (FIG. 4) formed between the opposed ends of a pair of pipe sections 14 formed of concrete or any other suitable material and connected together in axial end-to-end relation. Each of the pipe sections 14 is provided with an integral outer annular extension 16 at one end thereof and an integral inner annular extension 18 at the other end, the outer and inner annular extensions 16 and 18 of adjacent pipe section ends interfitting and being mated together in a manner forming a lap joint as shown in FIGS. 1 and 4. Sealing member 10 is inserted into groove 12 formed adjacent the inner wall surfaces of pipe sections 14 between the end face 20 of extension 18 and the recessed end face 22 of the adjacent pipe section 14. The insertion of sealing member 10 into groove 12 is facilitated by the application to the sides of groove 12 or to the sides of sealing member 10 of a suitable lubricant-adhesive 24 (FIG. 4) which, when set, cements sealing member 10 in place.

As shown in FIG. 2, sealing member 10 comprises a body 26 preferably composed of an elastomeric material, such as neoprene for example, or any other suitable resiliently yieldable material having similar properties of durability and high abrasion resistance, capable of withstanding temperature extremes, moisture, and other environmental conditions to which it may be subject in use. Sealing member 10 is formed as an elongated, unitary, one-piece construction of indefinite length by a suitable extrusion process and can be cut to any desired length and shaped to form the annular seal, the abutting ends of sealing member 10 being adhesively secured together, as at 28 in FIG. 3, to provide an endless annular seal. Also, sealing member 10 can be of any desired width to conform to the width of the groove with which it is to be used. Although the sealing member of this invention is shown in the illustrative embodiment in use in annular joints between pipe sections, it should be understood that such sealing member is in no manner limited to such use and has general utility in various joint applications, including the horizontally extending joints provided between semi-cylindrical pipe sections, and in sidewalks, and is especially adapted for use in architectural concourses, as will hereinafter be more fully explained. Of course, in such applications, sealing member 10 remains in its initial linearly extending attitude so as to take the longitudinal shape of the joint.

Sealing member body 26 (FIG. 2) comprises side walls 30 and 32 which are substantially parallel and straight from end to end and from top to bottom. The upper edges of side walls 30 and 32 are connected to a top wall 34 having upwardly sloping portions 36 and 38 extending inwardly from the upper edges of side walls 30 and 32 and a pair of inner, more sharply sloping portions 40 and 42 extending inwardly and upwardly from the inner ends of portions 36 and 38 and which converge to form an inverted, generally V-shaped formation joined to the neck of a T-shaped head formation, generally designated 44, hereinafter described in detail. As used herein, the terms upper, lower, top, bottom, vertical, horizontal and the like are applied only for convenience of description with reference to FIG. 2 and should not be taken as limiting the scope of this invention.

The lower edges of side walls 30 and 32 are connected to a bottom wall 46 having downwardly sloping portions 48 and 50 which converge to form a V-shaped bottom wall. Top and bottom walls 34, 46 are formed integral with side walls 30 and 32 to form corners therewith and define a tubular structure. The juncture or intersection of side walls 30 and 32 with top and bottom walls 34, 46 can be curved rather than angular, if desired, to provide rounded corners.

Sealing member body 26 is provided with an internal supporting truss structure comprising a pair of cross bars 52 and 54 which extend diagonally from the upper portions of side walls 30 and 32 adjacent but spaced from the junctures thereof with the top wall to the bottom portions of side walls 32 and 30 adjacent but spaced from the junctures thereof with bottom wall 46. Cross bars 52 and 54 intersect approximately midway between their respective opposite ends leaving a V-shaped space and an inverted V-shaped space therebetween in the upper and lower halves of sealing member 10 as well as large open spaces on opposite sides thereof into which various portions of sealing member 10 can collapse when compressed.

As shown in FIG. 2, the height of sealing member body 26 is greater than the width thereof and side walls 30 and 32 are formed relatively deep, from top to bottom, to assume a relatively large sealing surface against the adjoining support surfaces to provide a strong, reliable fluid tight seal therebetween preventing the passage of foreign liquids and solids into the interior of pipe sections 14 and to preclude the egress of the material flowing therethrough outwardly through the joint.

Sealing member body 26 is of a width such that when installed, it is at least slightly compressed at the maximum width of the joint groove 12. Cross bars 52 and 54 offer support for side walls 30 and 32 during compression and expansion of sealing member body 26 caused by expansion and contraction of pipe sections 14 due to thermal variations, providing reaction forces maintaining side walls 30, 32 in tight sealing engagement against the groove walls 20, 22. The large open spaces within body 26 assure proper folding of the cross bars when sealing member 10 is compressed.

In accordance with this invention, sealing member 10 is provided with a T-shaped head formation 44 connected to sealing member top wall 34 by a relatively thick neck portion 56 joined to top wall 34 at the juncture of sloping portions 40 and 42. Head formation 44 is formed integral with top wall 34 and of the same material as the tubular body 26 of sealing member 10, is solid throughout, and extends lengthwise of sealing member body 26. Neck portion 56 separates head formation 44 from sealing member body 26, allowing the latter to be independently compressible without disturbing the former. While neck portion 56 is depicted in the drawings as being relatively thick and solid throughout, it should be understood that neck portion 56 can be made thin and/or hollow to provide a tubular formation lengthwise thereof, if desired.

As best seen in FIG. 2, head formation 44 comprises a pair of wings 58 and 60 extending laterally in opposite directions from the upper end of neck portion 56 in spaced relation to sealing member body 26 and adapted to completely bridge or span the groove 12 an overlie the adjacent surfaces of pipe sections 14. As shown in FIGS. 1 and 4, the inner surfaces of wings 58 and 60 are adhesively secured to the inner, cylindrical wall surfaces of pipe sections 14 adjacent groove 12 by a suitable adhesive 62. Thus, formation 44 serves as a protective shield spanning and overlying the joint between adjacent pipe sections 14 preventing the passage of the materials flowing therethrough outwardly through the joint. Moreover, any pressure serving to force material through the pipeline comprised of pipe sections 14 also is effective to urge wings 58 and 60 more tightly against the inner wall surfaces of pipe sections 14 to facilitate the sealing function of sealing member 10. Indeed, the curved formation of wings 58 and 60 tend to generate a radially inwardly directed force urging the same against their associated seating surfaces so that the use of adhesive 62, while preferable, is not necessary in certain applications. When using sealing member 10 in architectural applications, it is desirable not to use an adhesive because of the relative movement of the adjacent building slabs.

Wings 58 and 60 are provided with inclined portions 64 and 66 tapering toward lateral edges 68 and 70 which are of substantially knife edge thicknesses to provide a smooth transition between the inner cylindrical wall surfaces of pipe sections 14 and the outer edges 68 and 70 of wings 58 and 60 to avoid turbulence of the flowing materials passing through pipe sections 14 and to prevent interference with the smooth flow thereof.

While wings 58 and 60 are shown in the illustrative embodiment depicted in the drawings as projecting substantially beyond the side walls 30 and 32 of body 26, it should be realized that such wings 58 and 60 can be substantially shortened to have a lateral extent approximating or just slightly greater than the width of sealing member body 26 so as to terminate in lateral edges disposed in or spaced just slightly outwardly from the vertical planes of side walls 30 and 32 when sealing member 10 is in its natural, relaxed state. Also, wings 58 and 60 can be substantially thinner than shown, if desired, within the purview of this invention.

Sealing member side walls 30 and 32 are formed relatively deep when compared with the width of sealing member 10 to provide large interfacial sealing surfaces, further facilitating the sealing function thereof. This, together with the provision of the T-shaped formation 44 constitutes a dual sealing arrangement assuring positive fluid tight sealing under all conditions. If desired, sealing member 10 can be inserted in the offset groove formed between the opposed outer end portions of pipe sections 14 with T-shaped head formation 44 overlying portions of the outer peripheral surfaces of pipe sections 14. Of course, sealing member 10 also can be used in longitudinally extending joint grooves, such as those formed between the opposite halves of semi-cylindircal pipe sections of a two-piece pipe section, as well as those formed between architectural and pavement sections.

FIG. 5 illustrates another form of sealing member, generally designated 10', of this invention, especially adapted for use in expansion grooves formed between adjacent, vertically extending building blocks or slabs 80 and 82 of architectural buildings and the like. Sealing member 10' is similar to the sealing member 10, first described, in many respects and the same reference characters are used to designated similar elements. Sealing member 10' (FIG. 5) differs from the sealing member 10 of FIG. 2 in three respects, as described below.

In addition to cross bars 52 and 54, sealing member 10' is provided with a compression bar extending transversely from the lower portion of side wall 30 just below the lower end of cross bar 54 to the lower portion of side wall 32 just below the lower end of cross bar 52 in spaced relation to and above bottom wall 46, defining a space 86 therebetween. Compression bar 84 comprises a pair of angularly related portions 88 and 90 extending inwardly and downwardly from side walls 30 and 32 at a slight angle to a horizontal plane cut through sealing member 10' and joined together at a juncture 92. Compression bar 84 is important in providing support for side walls 30 and 32 to prevent inward buckling thereof and in providing a force acting outwardly against side walls 30 and 32 to preclude displacement thereof away from the adjoining supporting surfaces of slabs 82 and 80 during expansion of sealing member 10' upon contraction of the adjacent slabs 82 and 80. At the same time, the angular juncture 92 between compression bar portions 88 and 90, which defines an angle of only slightly less than 180°, forms a knee or bend which facilitates the folding of compression bar 84 into the space 86 in the lower end of sealing member 10' during the compression thereof. Because of this knee juncture 92, compression bar 84 offers substantially less resistance to the inward movement of side walls 30 and 32 during compression of sealing member 10' than it would it such bar were straight. As a result, side walls 30 and 32 and the overall sealing member body are not unduly stressed, thereby limiting the maximum reactive force exerted by sealing member 10' in normal usage. While such compression bar 84 is important in a sealing member 10' employed in an architectural application, it should be understood that such a compression bar can be incorporated in the sealing member 10 of FIG. 2, if desired, for use in a pipe joint application.

The neck portion 56 connecting head formation 44 to sealing member body 26 is formed with an elongated opening 94 extending lengthwise thereof. This hollow construction of neck portion 56 not only conserves material, but also renders neck portion 56 more flexible enabling it to be readily yeildable for ease of insertion and/or removal of sealing member 10' into and from within its associated groove. Neck portion 56 of sealing member 10 (FIG. 2) also can be provided with a similar hollow construction, if desired.

Head formation 44 of sealing member 10' also differs from that shown in FIG. 2 by providing wings 58 and 60 of appreciably shorter lateral dimensions. while wing edges 68 and 70 are shown projecting somewhat beyond the vertical planes of sealing member side walls 30 and 32 in FIG. 5, it should be appreciated that sealing member body 26 is shown in a partially compressed state and that when in its natural, relaxed condition, wing edges 68 and 70 project just slightly past the vertical planes of sealing member side walls 30 and 32. Of course, wings 58 and 60 can take any lateral dimensions, as desired. As opposed to piping applications, the inner surfaces of wings 58 and 60 preferably are not adhesively secured to the outer faces of slabs 80 and 82, but rather rest thereagainst to accommodate relative movement of slabs 80 and 82 toward and away from each other. The arcuately shaped curvature of wings 58 and 60 tends to urge them inwardly toward the outer faces slabs 80 and 82 to provide pressure sealing thereagainst.

Since aesthetic considerations are important in architectural structures, it is a feature of this invention that head formation 44 of sealing member 10 can be formed in various colors compatible with adjoining building materials. It has been found that basic synthetic plastic materials, such as the Neoprene of which sealing members 10 and 10' are formed for example, can be colored by adding certain fillers or additives thereto. Also, only certain portions of the material can be so treated and then extruded through a single die to yield a unitary, one piece product having differently colored portions. However, the addition of fillers or additives to those portions of the basic material somewhat weakens such portions and detracts from the desirable physical properties thereof normally required of seals used in expansion or contraction joints. However, since T-shaped head formation 44 is disposed exteriorly of the groove and is not relied upon for pressure generation or pressure sealing within the groove formed between adjacent slabs 80 and 82, such reduced strength and lowering of the physical properties of head formation 44 as may result from treating the same to obtain a desired color can be readily tolerated. Forming head formation 44 of a different color compatible with the materials of an architectural structure is highly desirable to present an attractive and pleasing an attractive and pleasing appearance from the standpoint of aesthetics.

From the foregoing, it is apparent that the present invention fully accomplishes its intended objects and provides an improved sealing member especially adapted for sealing the grooves of joints formed between adjacent construction sections. The provision of an integral T-shaped head formation 44 on sealing member 10 to overlie and completely cover the joint offers additional sealing, providing in effect a dual seal, assuring against the escape of flowing materials outwardly from the pipe sections 14 and the ingress of foreign matter thereinto through the joint.

In architectural constructions, the body of sealing member 10' can be provided with a pre-formed compression bar extending between the sealing member side walls to control the extent of reaction forces generated in the sealing member and to facilitate the controlled collapse thereof. The integral T-shaped head formation 44 can be connected to body 26 of sealing member 10' by a hollow neck portion for added flexibility. Also, head formation 44 can be colored to provide any desired aesthetic effect compatible with the associated building materials in an architectural application.

Illustrative embodiments of this invention having been described in detail, it is to be understood that this has been done by way of illustraton only.

I claim:

1. A sealing member comprising a resiliently yeildable, hollow tubular body, and a generally T-shaped formation formed integral with said body and having laterally extending wings overlying said tubular body in spaced relation thereto, said tubular body having a top wall, a bottom wall and opposite side walls and said T-shaped formation being joined to said top wall, said tubular body further including a pair of internal cross bars extending downwardly at an angle from the upper portions of said side walls at points spaced below the ends thereof to the lower portions of the opposite ones of said side walls at points spaced above the ends thereof and in supporting relation thereto, said cross bars intersecting intermediate their opposite ends, and said tubular body further including a compression bar extending transversely from one of said side walls to the other of said side walls below the intersection of the lower ends of said cross bars with said side walls in a spaced relation to said bottom wall for preventing buckling of said side walls upon compression thereof and facilitating the controlled collapse of said body and wherein said compression bar includes a pair of angularly related portions extending inwardly and slightly downwardly from said side walls and joined together at a common juncture at an angle slightly less than 180°.

2. A sealing member according to claim 1 wherein said compression bar defines with said bottom wall an open space into which said compression bar folds upon compression of said body.

3. A sealing member according to claim 1 wherein said cross bars and said compression bar define with side walls of said body relatively large open spaces into which portions of said sealing member can collapse during compression thereof.

4. A sealing member as set forth in claim 1 wherein said top wall has a first pair of upwardly sloping portions extending inwardly from said side walls and a second pair of upwardly sloping portions extending inwardly from said first pair of sloping portions in a converging relation and joined together at a common juncture.

5. A sealing member as set forth in claim 4 wherein said common juncture includes a hollow portion throughout for added flexibility.

* * * * *

UNITED STATES PATENT OFFICE
CERTIFICATE OF CORRECTION

Patent No. 3,912,286    Dated October 14, 1975

Inventor(s) James J. Kerschner    Page 1 of 3

It is certified that error appears in the above-identified patent and that said Letters Patent are hereby corrected as shown below:

Columns 5, 6, 7 and 8 as shown on the attached sheets should be included, but will apply exclusively to the grant.

Signed and Sealed this ninth Day of March 1976

[SEAL]

Attest:

RUTH C. MASON
*Attesting Officer*

C. MARSHALL DANN
*Commissioner of Patents and Trademarks* well as those formed between architectural and pavement sections.

FIG. 5 illustrates another form of sealing member, generally designated 10', of this invention, especially adapted for use in expansion grooves formed between adjacent, vertically extending building blocks or slabs 80 and 82 of architectural buildings and the like. Sealing member 10' is similar to the sealing member 10, first described, in many respects and the same reference characters are used to designated similar elements. Sealing member 10' (FIG. 5) differs from the sealing member 10 of FIG. 2 in three respects, as described below.

In addition to cross bars 52 and 54, sealing member 10' is provided with a compression bar extending transversely from the lower portion of side wall 30 just below the lower end of cross bar 54 to the lower portion of side wall 32 just below the lower end of cross bar 52 in spaced relation to and above bottom wall 46, defining a space 86 therebetween. Compression bar 84 comprises a pair of angularly related portions 88 and 90 extending inwardly and downwardly from side walls 30 and 32 at a slight angle to a horizontal plane cut through sealing member 10' and joined together at a juncture 92. Compression bar 84 is important in providing support for side walls 30 and 32 to prevent inward buckling thereof and in providing a force acting outwardly against side walls 30 and 32 to preclude displacement thereof away from the adjoining supporting surfaces of slabs 82 and 80 during expansion of sealing member 10' upon contraction of the adjacent slabs 82 and 80. At the same time, the angular juncture 92 between compression bar portions 88 and 90, which defines an angle of only slightly less than 180°, forms a knee or bend which facilitates the folding of compression bar 84 into the space 86 in the lower end of sealing member 10' during the compression thereof. Because of this knee juncture 92, compression bar 84 offers substantially less resistance to the inward movement of side walls 30 and 32 during compression of sealing member 10' than it would it such bar were straight. As a result, side walls 30 and 32 and the overall sealing member body are not unduly stressed, thereby limiting the maximum reactive force exerted by sealing member 10' in normal usage. While such compression bar 84 is important in a sealing member 10' employed in an architectural application, it should be understood that such a compression bar can be incorporated in the sealing member 10 of FIG. 2, if desired, for use in a pipe joint application.

The neck portion 56 connecting head formation 44 to sealing member body 26 is formed with an elongated opening 94 extending lengthwise thereof. This hollow construction of neck portion 56 not only conserves material, but also renders neck portion 56 more flexible enabling it to be readily yeildable for ease of insertion and/or removal of sealing member 10' into and from within its associated groove. Neck portion 56 of sealing member 10 (FIG. 2) also can be provided with a similar hollow construction, if desired.

Head formation 44 of sealing member 10' also differs from that shown in FIG. 2 by providing wings 58 and 60 of appreciably shorter lateral dimensions, while wing edges 68 and 70 are shown projecting somewhat beyond the vertical planes of sealing member side walls 30 and 32 in FIG. 5, it should be appreciated that sealing member body 26 is shown in a partially compressed state and that when in its natural, relaxed condition, wing edges 68 and 70 project just slightly past the vertical planes of sealing member side walls 30 and 32. Of course, wings 58 and 60 can take any lateral dimensions, as desired. As opposed to piping applications, the inner surfaces of wings 58 and 60 preferably are not adhesively secured to the outer faces of slabs 80 and 82, but rather rest thereagainst to accommodate relative movement of slabs 80 and 82 toward and away from each other. The arcuately shaped curvature of wings 58 and 60 tends to urge them inwardly toward the outer faces slabs 80 and 82 to provide pressure sealing thereagainst.

Since aesthetic considerations are important in architectural structures, it is a feature of this invention that head formation 44 of sealing member 10 can be formed in various colors compatible with adjoining building materials. It has been found that basic synthetic plastic materials, such as the Neoprene of which sealing members 10 and 10' are formed for example, can be colored by adding certain fillers or additives thereto. Also, only certain portions of the material can be so treated and then extruded through a single die to yield a unitary, one piece product having differently colored portions. However, the addition of fillers or additives to those portions of the basic material somewhat weakens such portions and detracts from the desirable physical properties thereof normally required of seals used in expansion or contraction joints. However, since T-shaped head formation 44 is disposed exteriorly of the groove and is not relied upon for pressure generation or pressure sealing within the groove formed between adjacent slabs 80 and 82, such reduced strength and lowering of the physical properties of head formation 44 as may result from treating the same to obtain a desired color can be readily tolerated. Forming head formation 44 of a different color compatible with the materials of an architectural structure is highly desirable to present an attractive and pleasing an attractive and pleasing appearance from the standpoint of aesthetics.

From the foregoing, it is apparent that the present invention fully accomplishes its intended objects and provides an improved sealing member especially adapted for sealing the grooves of joints formed between adjacent construction sections. The provision of an integral T-shaped head formation 44 on sealing member 10 to overlie and completely cover the joint offers additional sealing, providing in effect a dual seal, assuring against the escape of flowing materials outwardly from the pipe sections 14 and the ingress of foreign matter thereinto through the joint.

In architectural constructions, the body of sealing member 10' can be provided with a pre-formed compression bar extending between the sealing member side walls to control the extent of reaction forces generated in the sealing member and to facilitate the controlled collapse thereof. The integral T-shaped head formation 44 can be connected to body 26 of sealing member 10' by a hollow neck portion for added flexibility. Also, head formation 44 can be colored to provide any desired aesthetic effect compatible with the associated building materials in an architectural application.

Illustrative embodiments of this invention having been described in detail, it is to be understood that this has been done by way of illustraton only.

I claim:

1. A sealing member comprising a resiliently yeildable, hollow tubular body, and a generally T-shaped formation formed integral with said body and having laterally extending wings overlying said tubular body in spaced relation thereto, said tubular body having a top wall, a bottom wall and opposite side walls and said T-shaped formation being joined to said top wall, said tubular body further including a pair of internal cross bars extending downwardly at an angle from the upper portions of said side walls at points spaced below the ends thereof to the lower portions of the opposite ones of said side walls at points spaced above the ends thereof and in supporting relation thereto, said cross bars intersecting intermediate their opposite ends, and said tubular body further including a compression bar extending transversely from one of said side walls to the other of said side walls below the intersection of the lower ends of said cross bars with said side walls in a spaced relation to said bottom wall for preventing buckling of said side walls upon compression thereof and facilitating the controlled collapse of said body and wherein said compression bar includes a pair of angularly related portions extending inwardly and slightly downwardly from said side walls and joined together at a common juncture at an angle slightly less than 180°.

2. A sealing member according to claim 1 wherein said compression bar defines with said bottom wall an open space into which said compression bar folds upon compression of said body.

3. A sealing member according to claim 1 wherein said cross bars and said compression bar define with side walls of said body relatively large open spaces into which portions of said sealing member can collapse during compression thereof.

4. A sealing member as set forth in claim 1 wherein said top wall has a first pair of upwardly sloping portions extending inwardly from said side walls and a second pair of upwardly sloping portions extending inwardly from said first pair of sloping portions in a converging relation and joined together at a common juncture.

5. A sealing member as set forth in claim 4 wherein said common juncture includes a hollow portion throughout for added flexibility.

* * * * *